United States Patent Office 2,979,399
Patented Apr. 11, 1961

2,979,399

PREPARATION OF COMPACTS MADE FROM URANIUM AND BERYLLIUM BY SINTERING

Roswell P. Angier, New York, N.Y., assignor, by mesne assignments, to the United States of America as represented by the United States Atomic Energy Commission No Drawing. Filed Dec. 27, 1950, Ser. No. 203,043

9 Claims. (Cl. 75—214)

This invention relates to the preparation of an uranium and beryllium product having almost theoretical density. More particularly, this invention relates to a method of preparing a product of this type by powder metallurgical techniques.

Although it has frequently been deemed desirable to obtain a dense product in which U is uniformly distributed in a beryllium matrix it has not heretofore been found practical to do this even with powder metallurgical techniques in which the U and Be powder are mixed, compacted, and sintered. For with the methods of the prior art as previously disclosed in the literature the product is porous and of low density.

It is an object of this invention to provide a means for preparing a dense product consisting of a uniform distribution of U in Be.

It is a further object of this invention to provide a method of preparing a dense non-porous product of this type.

It has been found that these objects and other advantages incidental to its application can be obtained by powder metallurgical methods, if a powdered mixture consisting of $UBe_9$ and Be is sintered at a temperature above the eutectic temperature of this mixture by heating the compacted powder to this temperature almost instantaneously.

In its essential characteristics this process consists in mixing $UBe_9$ particles with particles of Be compacting and heating the compacted mixture almost instantaneously to a temperature lying within the range of 1220 to 1280° C. in an atmosphere of argon, hydrogen, or other inert gas.

The $UBe_9$ given above as the starting material may be formed in the following manner: U and Be powders are screened together through a suitable screen whereupon the mixture is tumbled for two hours, rescreened and then remixed for an interval of approximately one hour. The mixture so obtained may then be briquetted and placed loosely in beryllia boats for vacuum sintering for about 14–48 hours at 1250° C. Material formed upon grinding the sintered briquettes or cakes is essentially $UBe_9$. It is, of course, understood that all processing of the U powder and the mixing with the Be to form the $UBe_9$ and any subsequent grinding mixing of the $UBe_9$ powder with Be powder should be carried out in a nonoxidizing atmosphere such as argon or hydrogen.

The $UBe_9$ powders so obtained is then preferably ground to the desired size. If best results are to be obtained particle sizes of the order of two microns is recommended. The ground $UBe_9$ particles are then mixed with particles of Be powder whose particle size is somewhat larger preferably in the neighborhood of 17 microns in size. After being thoroughly mixed in a non-oxidizing atmosphere the powders are compacted at a suitable pressure. The so compacted product is then sintered at a temperature above the eutectic of the composition which is 1220° C. but below the melting point of 1280° C. the temperature preferably being held at about 1262° C., this temperature to be reached as promptly as possible and at any rate within one minute if possible.

The table given below is illustrative of the experimental values obtained when the rate of heating is varied. These values indicate the effect of heating rate in purified argon gas on the sintered density of the $UBe_9$ plus Be mixture:

Table

| Sample | Heating Rate, °C./Min. | Density, g./cc. | Percent of Density of Mixture | Description |
|---|---|---|---|---|
| 1 | 1,262 | 2.17 | 91.5 | 33 wt. percent of $2\mu$ $UBe_9$ particles plus $17\mu$ Be particles; 1 hr. |
|   | 1,262 | 2.16 | 91.5 |  |
| 2 | 1,220 | 2.06 | 87.0 |  |
| 2e | 1,262 | 2.06 | 80.0 | 44 wt. percent of $9\mu$ $UBe_9$ particles plus $17\mu$ Be particles; 3 hrs. |
| 2b | 126 | 1.65 | 64.0 |  |
| 2d | 84 | 1.32 | 51.2 |  |
| 2a | 4 | 1.11 | 43.0 |  |
| 2c | 4 | 0.87 | 33.8 |  |
| 1e | 1,262 | 1.83 | 71.0 | 44 wt. percent of $30\mu$ $UBe_9$ particles plus $17\mu$ Be particles; 3 hrs. |
| 1b | 126 | 1.66 | 64.3 |  |
| 1d | 84 | 1.38 | 53.5 |  |
| 1a | 4 | 1.17 | 45.4 |  |
| 1c | 4 | 0.87 | 34.7 |  |
| 3e | 1,262 | 2.02 | 79.0 | 44 wt. percent of $35\mu$ $UBe_9$ particles plus $17\mu$ Be particles; 3 hrs. |
| 3b | 126 | 1.85 | 72.3 |  |
| 3d | 84 | 1.67 | 65.3 |  |
| 3a | 4 | 1.27 | 49.5 |  |
| 3c | 4 | 1.12 | 43.7 |  |

Samples pressed at 50 t.s.i. to 80% of density of mixture.
Sintering temperature 1262° C. for 3 hrs. except where noted otherwise.

The above table is also indicative of the fact that best results can be obtained when the particle size of the $UBe_9$ is kept as small and uniform as possible preferably in the neighborhood of two microns.

The table shows the attainment of a uniform distribution of $UBe_9$ particles in a matrix of Be sintered to 91.5% of the ideal density of the mixture consisting of 33 weight percent $UBe_9$ plus 67 weight percent Be. The concomitant introduction of the variables instantaneous heating to above the $UBe_9$–Be eutectic temperature of about 1220° C. and very fine $UBe_9$ particle size (two micron average) indicate that eutectic melting at frequently distributed points of contact between $UBe_9$ and Be particles is a critical determinant of a high sintered density in this matrix. In addition, the critical effect of instantaneous heating to the sintered temperature of 1262° C. is revealed in this same table where it is seen that samples briquetted to 80% of ideal mixture density may decrease to 34% of ideal mixture density at a heating rate of 4° per minute.

The overall densification of the briquette depends upon the sintering together of adjacent micro scale regions. In this system it appears necessary that there be eutectic melting at the same instant at many points of contact between $UBe_9$ and Be particles to affect the overall densification of the briquette. Otherwise, the densely packed micro scale regions sinter unto themselves and the resulting movement within the briquette places them too far from adjacent regions for the overall sintering together of adjacent regions.

While the above description describes preferred and practical embodiments of the method of preparing dense products in which $UBe_9$ is uniformly distributed in Be it will be understood by those skilled in the art that the specific details described are by way of illustration and are not to be construed as limiting the scope of the invention.

What is claimed is:
1. The method of uniformly distributing U in Be which comprises mixing the desired proportion of $UBe_9$ with the desired proportion of powdered Be, compacting the powdered mixture under pressure and sintering the compacted material at a temperature lying between the eutectic temperature of the mixture and the melting point of Be by instantaneous heating to the desired temperature.

2. The method of uniformly distributing U in Be which comprises mixing the desired proportion of $UBe_9$ with the desired proportion of powdered Be, compacting the powdered mixture under pressure and sintering the compacted material at a temperature lying within the range of 1220–1280° C.

3. The method of uniformly distributing U in Be which comprises mixing the desired proportion of $UBe_9$ with the desired proportion of powdered Be, compacting the powdered mixture under pressure and sintering the compacted material at a temperature of 1262° C.

4. The method of uniformly distributing U in Be which comprises mixing the desired proportion of $UBe_9$ with the desired proportion of powdered Be, compacting the powdered mixture under pressure and sintering the compacted material at a temperature lying between the eutectic temperature of the mixture and the melting point of Be by instantaneous heating to the desired temperature, said operations all being carried out in an inert atmosphere.

5. The method of uniformly distributing U in Be which comprises mixing the desired proportion of $UBe_9$ with the desired proportion of powdered Be, compacting the powdered mixture under pressure and sintering the compacted material at a temperature lying within the range of 1220–1280° C. by instantaneous heating to the desired temperature, said operations being carried out in an inert atmosphere.

6. The method of uniformly distributing U in Be which comprises mixing the desired proportion of $UBe_9$ with the desired proportion of powdered Be, compacting the powdered mixture under pressure and sintering the compacted material at a temperature of 1262° C. by instantaneous heating to the desired temperature, said operations being carried out in an atmosphere of argon.

7. The method of uniformly distributing U in Be which comprises vacuum sintering a mixture of U and Be powders for about 14–48 hours at a temperature of approximately 1250° C., grinding the material so formed, mixing the powdered product with powdered Be, compacting the mixture and sintering the compacted mixture at a temperature within the range of 1220 to 1280° C. by instantaneous heating.

8. The method of uniformly distributing U in Be which comprises mixing the desired proportion of $UBe_9$ having an average particle size of about $6\mu$ with the desired proportion of powdered Be having a relatively coarser particle size, compacting the powdered mixture under pressure and sintering the compacted material at a temperature lying within the range of 1220–1280° C. by instantaneous heating to the desired temperature, said operations being carried out in an inert atmosphere.

9. The method of uniformly distributing U in Be which comprises mixing the desired proportion of $UBe_9$ having an average particle size of about $2\mu$ with the desired proportion of powdered Be having an average particle size of $17\mu$, compacting the powdered mixture under pressure and sintering the compacted material at a temperature of 1262° C. by instantaneous heating to the desired temperature, said operations being carried out in an atmosphere of argon.

References Cited in the file of this patent

Angier et al.: U.S.A.E.C. Document SEP–6, 18 pages, dated October 29, 1948, declassified December 8, 1955, available from Office Technical Services, Department of Commerce, Washington 25, D.C., @ 20 cents. 75/200 (A).